(12) United States Patent
Steinhanses et al.

(10) Patent No.: US 8,770,230 B2
(45) Date of Patent: Jul. 8, 2014

(54) TUBULAR COMPONENT

(75) Inventors: Nadine Steinhanses, Lennestadt (DE); Christian Müller, Lennestadt (DE); Kai-Michael Meissner, Kreuztal (DE)

(73) Assignee: Viega GmbH & Co. KG, Attendorn (DE)

( * ) Notice: Subject to any disclaimer, the term of this patent is extended or adjusted under 35 U.S.C. 154(b) by 463 days.

(21) Appl. No.: 12/960,803

(22) Filed: Dec. 6, 2010

(65) Prior Publication Data

US 2011/0132487 A1 Jun. 9, 2011

(30) Foreign Application Priority Data

Dec. 7, 2009 (DE) .......................... 10 2009 056 975

(51) Int. Cl.
*F16L 9/00* (2006.01)
(52) U.S. Cl.
USPC .......................................... 138/109; 138/121
(58) Field of Classification Search
USPC .................................................. 138/121, 109
See application file for complete search history.

(56) References Cited

U.S. PATENT DOCUMENTS

| 2,962,091 | A | * | 11/1960 | Sabel | 239/557 |
|---|---|---|---|---|---|
| 3,578,777 | A | * | 5/1971 | DeGain | 138/121 |
| 3,605,817 | A | * | 9/1971 | Bauman | 138/121 |
| 3,717,368 | A | * | 2/1973 | Czarnecki et al. | 403/343 |
| 5,439,035 | A | * | 8/1995 | Dal Palu e,acu uAttilio | 138/121 |
| 5,706,864 | A | * | 1/1998 | Pfleger | 138/121 |
| 5,792,532 | A | * | 8/1998 | Pfleger | 428/36.9 |
| 6,021,816 | A | * | 2/2000 | Jeltsch et al. | 138/121 |
| 6,056,018 | A | * | 5/2000 | Renaud | 138/121 |
| 6,116,289 | A | * | 9/2000 | Hayashi | 138/122 |
| 7,147,007 | B2 | * | 12/2006 | Renaud | 138/121 |
| 2012/0085454 | A1 | * | 4/2012 | Bertero et al. | 138/121 |

FOREIGN PATENT DOCUMENTS

| EP | 1265019 | 12/2002 |
|---|---|---|
| EP | 1775507 | 4/2007 |
| EP | 1930640 | 6/2008 |

* cited by examiner

*Primary Examiner* — James Hook (74) *Attorney, Agent, or Firm* — The Webb Law Firm (57) ABSTRACT

A tubular component with an end section has a profile, wherein the profile comprises a plurality of holding elements axially offset in longitudinal direction of the end section. The holding elements comprise at least one first azimuthal contour region and at least one second azimuthal contour region, wherein the outer contour of a holding element in the first contour region at least in sections is lowered or raised relative to the second contour region and wherein the first contour regions of at least two holding elements are offset relative to each other in azimuthal direction.

10 Claims, 6 Drawing Sheets

TUBULAR COMPONENT

CROSS-REFERENCE TO RELATED APPLICATIONS

This application is a National Phase Application which claims the benefit of and priority to German patent application no. DE 10 2009 056 975.8-24, filed on Dec. 7, 2009. The disclosures of the above applications are incorporated herein by reference in their entirety.

FIELD OF THE INVENTION

The invention relates to a tubular component with an end section comprising a profile, wherein the profile comprises a plurality of holding elements axially offset in longitudinal direction of the end section, wherein the holding elements comprise at least one first azimuthal contour region and at least one second azimuthal contour region and wherein the outer contour of a holding element in the first contour region at least in sections is lowered or raised relative to the second contour region.

BACKGROUND

In the prior art, tubular components are preferably employed as pipe connectors for joining pipes by crimping. There, a pipe is pushed over the end section of a tubular component and then crimped to said end section preferably utilizing a crimping sleeve. The holding elements axially offset in longitudinal direction of the end section in the crimped state prevent axial relative movement between the pipe and the tubular component. In addition, these holding elements ensure a reliably tight joint. During the installation of such tubular components it can happen that the tubular component with the pipe pushed on to said component already seals so well in the uncrimped state that on checking the installation, during which liquid is piped through the pipe system, no liquid leaks from the uncrimped joint of pipe and tubular component, so that the installer does not notice the uncrimped state. Since pipe connectors as well as pipes are subject to certain size tolerances, such premature sealing can especially occur with a pipe connector that happens to be too large and a pipe that happens to be too small. An undiscovered, uncrimped joint can cause major damages and repair costs since it only loses its sealing property during the running operation of the installation and thus results in a possible liquid leakage and a pressure drop in the pipe system.

To prevent this problem, a tubular component was proposed in DE 201 09 548 U1, wherein the holding elements comprise clearances so that in the uncrimped state a continuous flow channel is ensured between the tubular component and the pipe. Through these continuous clearances on one side of the end section the connection between a pipe and a tubular component is weakened however, so that the tightness of the entire joint is reduced.

SUMMARY OF THE INVENTION

The present invention is therefore based on the aspect of making available a tubular component which avoids the above-mentioned disadvantages from the prior art.

With a generic tubular component this aspect is solved according to the invention in that the first contour regions of at least two holding elements are offset relative to each other in azimuthal direction.

In this manner, the regions in which the outer contour of the holding elements is raised or lowered and through this cause local weakening of the joint or locally increased loading of the pipe, respectively, are further away from each other and have a certain distribution over the entire outer circumference. It has been recognized that in this way a continuous weakening or an increased loading of the fitting in one azimuthal region can be reduced. Furthermore, a more even mean azimuthal crimping degree of the tubular component to a pipe, i.e. averaged over the overall length of the end section, can be achieved. Especially, the flow channel can also be lengthened over the entire length of the end section in this manner, so that the latter in the crimped state is sealed better.

The terms "azimuthal", "axial" and "radial" refer to the cylinder coordinates at which the axial axis of the cylinder coordinates coincides with the center axis of the end section.

Raising or lowering of the outer contour in sections in the first contour region means that the outer contour of the holding element in this contour region at least in a part section has a lesser or greater distance, respectively, to the center axis of the end section than the outer contour in the second contour region. In this manner, a flow channel between the holding element and the pipe is ensured with an uncrimped connection of such a tubular component with a pipe. Upon lowering, the lowered region itself, for example, constitutes the flow channel, upon raising, at least one flow channel adjoining the elevation is formed, for example. The raising or the lowering at the highest or lowest point of the first contour region, respectively, preferably amounts to between 0.1 and 0.9 mm, especially between 0.1 and 0.3 mm.

The first and the second contour region of the holding element does not necessarily mean regions physically distinct from each other, so that the outer contour between these contour regions or at the transition from a first to a second contour region, respectively, need not have any modification. It is merely necessary that a part region of the outer contour in the first contour region is raised or lowered relative to the outer contour of the second contour region. Especially, the first contour region is understood to be the smallest azimuthal region in which the respective raisings or lowerings are arranged.

In a first preferred embodiment of the tubular component according to the invention the first contour regions of two neighboring holding elements are offset relative to each other in azimuthal direction, especially by an angle between 15 and 180°, preferably by 90°. In this manner it is achieved that the local weakenings of the joint or the local loadings of the pipe due to the lowering or raising, respectively, are further away from each other in the first contour regions of neighboring holding elements, so that the weakening or the increased loading, respectively, is better distributed over the entire circumference of the end section. An angle between 15° and 180° has proved to be particularly advantageous for reducing the local weakening of the joint or the loading of the pipe, respectively. Especially, an angle of 90° is furthermore easy to produce. The contour regions of two neighboring holding elements can each be offset by a constant angle or by different angles. If offset by a constant angle, a distribution as even as possible of the local weakenings or loadings is achieved. With varying angles, an adjustment to specific requirements of the connection can take place.

The weakening of the connection or the loading of the pipe is reduced in a further preferred embodiment in that the first contour regions of two neighboring holding elements each do not overlap in azimuthal direction. In this manner, a minimum distance between the contour regions of neighboring holding elements is ensured. In addition, the length of the flow channel can be further lengthened in this manner.

In a further preferred embodiment of the tubular component according to the invention the first contour regions of the holding element are substantially distributed evenly over the entire azimuthal angular range. This embodiment makes possible a maximum distribution of the local weakenings of the connection or the local loadings of the pipe due to the raisings or lowerings, respectively, in the first contour regions over the entire circumference of the end section. In this manner, an even mean azimuthal crimping degree can be achieved.

In a further preferred embodiment of the tubular component according to the invention the first contour regions comprise a flattening, a clearance and/or an elevation. In the case of a flattening or a clearance, respectively, this directly makes available a flow channel. In the case of an elevation, at least one flow channel adjoining a side of the elevation is formed between the outer contour and a pipe. A flattening or a clearance is especially advantageous with thin-walled pipes, since in this manner the pipe is subjected to least load. An elevation is especially advantageous with low holding elements, since through these an adequate size of the flow channel is ensured.

In a further embodiment of the tubular component according to the invention the first contour regions and/or the second contour regions are designed similarly or dissimilarly. Through similarly designed contour regions the manufacture of the tubular component on the one hand is simplified and on the other hand a mean azimuthal crimping degree as even as possible over the entire connection is achieved. Through dissimilarly designed contour regions the connection in contrast can be flexibly adapted to the requirement profile of the connection. To this end, it is especially preferred to design the first contour regions dissimilarly and the second contour regions similarly. A reverse design is also conceivable.

A very even crimping degree of the individual holding elements is achieved in a further embodiment of the tubular component according to the invention in that the holding elements comprise a substantially ring-shaped outer contour and that the center axes of two neighboring holding elements are preferentially offset radially from each other. By offsetting the center axes, the outer contour of at least one holding element has an eccentricity relative to the end section of the tubular component. Because of this, the contour region with this holding element, in whose direction the center axis is offset, is raised relative to the opposite contour region. Through the offsetting of the center axis of the neighboring holding element the contour regions with a raised outer contour in azimuthal direction are offset from each other. Because of this, at least one flow channel is ensured between the respective holding element and a pipe in the respective lower contour regions of the holding elements. The distance between the center axes preferably amounts to between 0.1 and 0.9 mm, especially between 0.1 and 0.3 mm.

The center axis of a holding element means the axis parallel to the center axis of the end section, which runs through the center point of the outer contour of the holding element.

By the substantially ring-shaped outer contour of the holding elements a crimping degree with a pipe as even as possible is achieved. The even crimping degree can preferably be improved in that the holding element is designed without flattenings, clearances and/or elevations. In this manner, the crimped connection is not weakened due to clearances and the pipe is not subjected to loads through elevations, respectively.

In a further preferred embodiment of the tubular component according to the invention the outer contours of the holding elements are designed substantially similarly except for an azimuthal and/or radial offset. In this manner, the manufacture of the tubular elements is simplified. In addition, a more even mean crimping degree can be achieved in axial direction of the end section.

The costs for manufacturing a tubular component can be reduced according to a further embodiment of the tubular component according to the invention in that the tubular component is formed of a plastic. In this manner, the complex structure of the end section with its holding elements can be produced economically. Especially, plastic injection moulding is suitable for producing the tubular component.

BRIEF DESCRIPTION OF THE DRAWINGS

Additional features and advantages of the tubular component according to the invention can be taken from the following description of eight exemplary embodiments, wherein reference is made to the enclosed drawing. In the drawing FIG. 3b shows an enlarged detail from FIG. 3a, FIG. 4a-c show three additional exemplary embodiments of a tubular component according to the invention, FIG. 7a shows an eighth exemplary embodiment of a tubular component according to the invention and FIG. 7b shows a section through a holding element of the eighth exemplary embodiment from FIG. 7a.

DETAILED DESCRIPTION

Figure 1:
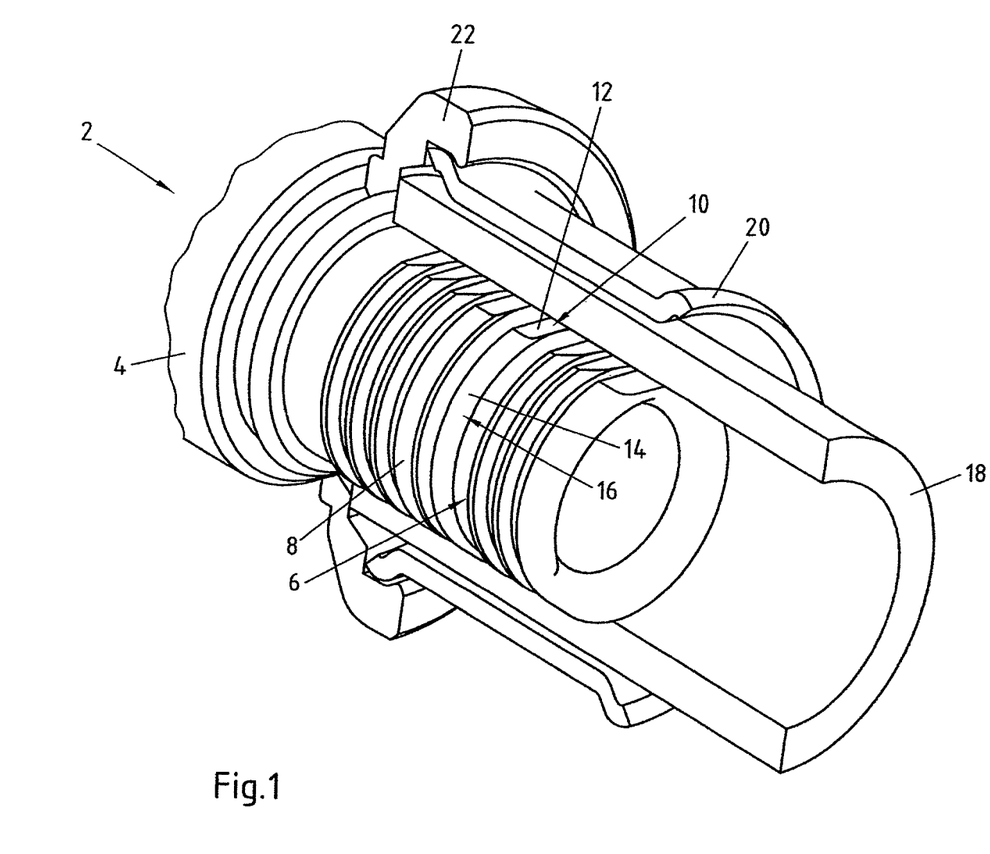
FIG. 1 shows a tubular component from the prior art.

FIG. 1 shows a tubular component from the prior art in perspective part-sectional view. The tubular component 2 comprises a flange region 4 and an end section 6 with ring-shaped holding elements 8. The holding elements 6 each comprise flattenings 12 in a first azimuthal contour region 10, so that the outer contour 14 in the first contour region 10 is lowered relative to a second contour region 16. The flattening preferably amounts to between 0.1 and 0.9 mm, especially between 0.1 and 0.3 mm. The flattening can especially also comprise a curvature. To produce a connection, a pipe 18 and a crimping sleeve 20 were pushed over the end section 6 of the tubular component 2. The crimping sleeve 20 is axially fixed with a ring 22 relative to the tubular component 2. The arrangement shown in FIG. 1 is in the uncrimped state. While the outer contour 14 of the holding elements 8 in the second contour region 16 substantially contacts the inner surface of the pipe 18, the outer contour 14 of the holding element 8 in the first contour region 10 is spaced from the inner surface of the pipe 18 in sections, so that in this region between the holding elements 8 and the pipe 18 a flow channel is ensured through which a liquid piped in the pipe 18 can flow and thus indicate the uncrimped state of the connection. However, upon crimping of the arrangements shown in FIG. 1 of a tubular component 2, the pipe 8 and the crimping sleeve 10 the connection in the region of the flattenings 14 is weakened throughout, so that the tightness and reliability of the shown connection is reduced.

Figure 2A:
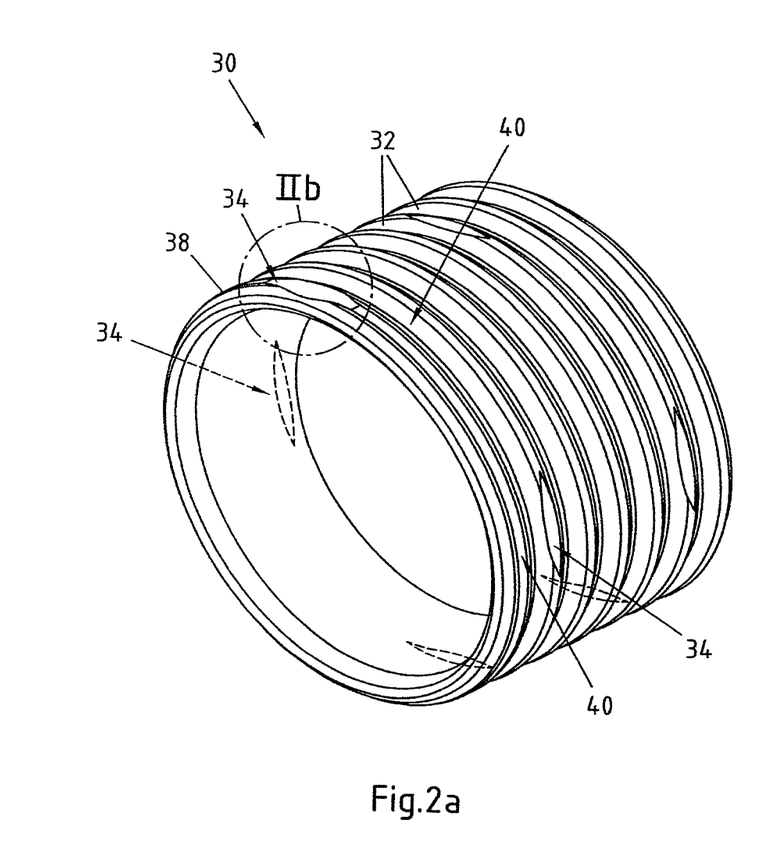
FIG. 2a shows a first exemplary embodiment of a tubular component according to the invention.
Figure 2B:
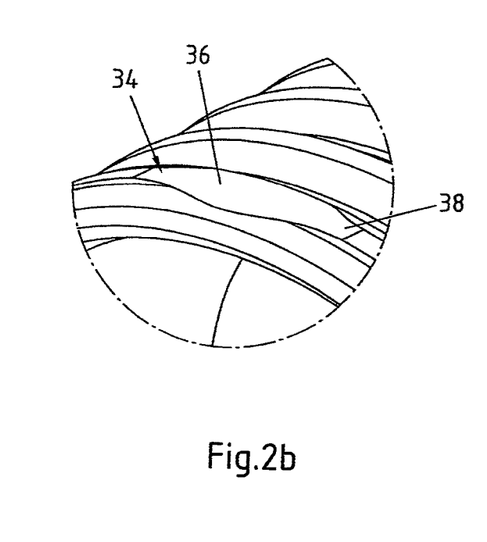
FIG. 2b shows an enlarged detail from FIG. 2a, FIG. 3a shows a second exemplary embodiment of a tubular component according to the invention.

FIGS. 2a and 2b now show a first exemplary embodiment of a tubular component according to the invention. In this regard, FIG. 2a only shows the end section in perspective view for the sake of clarity. The remaining part of the tubular component can for example be designed as shown in FIG. 1. The tubular component however is not limited to this embodiment. On the contrary, any desired other configuration, for example according to a tubular component known from the prior art, is also possible. FIG. 2b shows the detail of the end section marked IIb in FIG. 2a in enlarged representation.

The end section 30 shown in FIG. 2a comprises a profile of a plurality of ring-shaped holding elements 32 which are axially offset relative to one another in longitudinal direction of the end section 30. The holding elements 32 in FIG. 2a are substantially designed similarly and offset relative to one another by the same distance. However, it is also possible for example to design the holding elements 32 dissimilarly and/or to offset the holding elements 32 dissimilarly relative to one another. In this manner the holding elements 32 can be flexibly adapted to the requirements of the respective tubular component or the connection to be produced with said tubular component, respectively. The holding elements 32 comprise first contour regions 34, in which flattenings 36 are provided. Because of this the outer contour 38 of the holding elements 32 is lowered in the first contour region 34 relative to the remaining azimuthal region of the holding elements 32 designated second contour region 40. Instead of the flattenings 36 for example clearances can also be provided in the first contour regions 34. Through the flattenings 36 it is ensured that between the outer contour 38 and a pipe pushed onto the end section 30 a flow channel is formed.

The first contour regions 34 of the holding elements 32 are offset relative to one another in azimuthal direction. In FIG. 2a the first contour regions 34 of two neighboring holding elements 32 are each offset by an angle of 90° relative to each other. However, other angles or different angles are also possible. In FIG. 2a the first contour regions 34 of two neighboring holding elements 32 are especially arranged so that the first contour regions 34 do not overlap in azimuthal direction. In this manner it is achieved that the local weakening of the connection upon crimping of the end section 30 with a pipe is not cumulated in a single azimuthal region but distributed over a larger region, especially over the entire circumference of the end section 30.

Figure 3A:
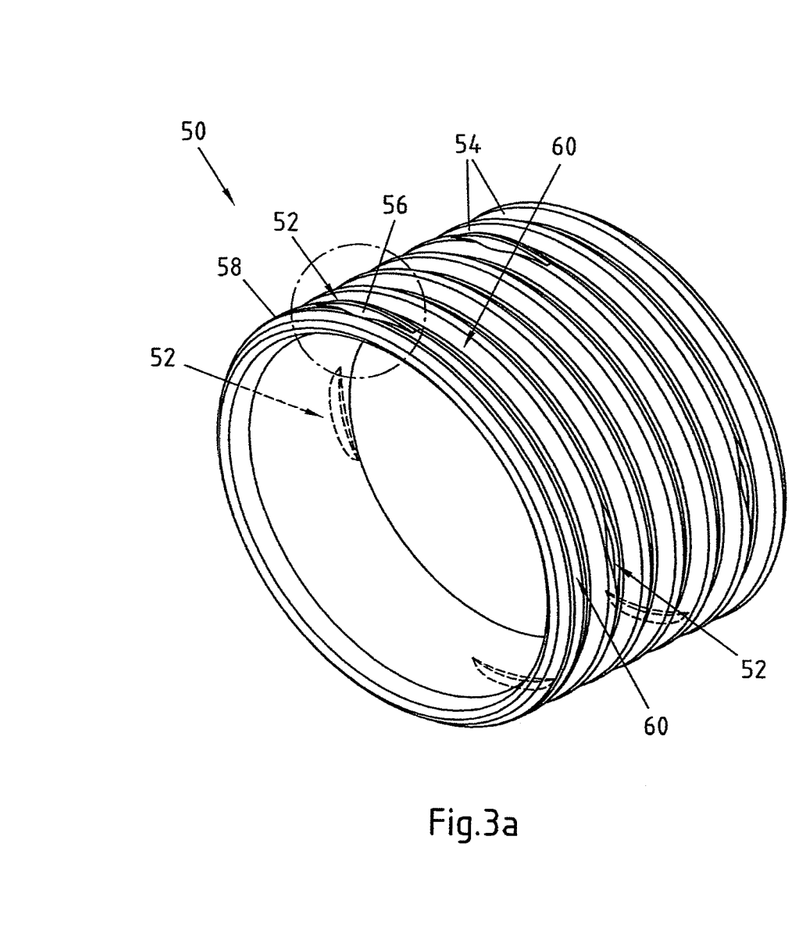
Figure 3B:
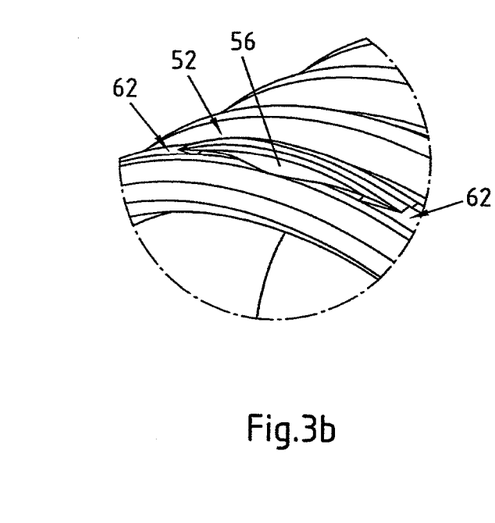

FIGS. 3a and 3b show a second exemplary embodiment of a tubular component according to the invention in perspective view, wherein for the sake of clarity in FIG. 3a only the end section and in FIG. 3b the detail marked IIIb in FIG. 3a is shown enlarged. The end section 50 differs from the end section 30 shown in FIG. 2a in that in the first contour regions 52 of the holding elements 54 elevations 56 instead of flattenings are formed. The elevations preferably have a height between 0.1 and 0.9 mm, especially between 0.1 and 0.3 mm. Because of this, the outer contour 58 of the respective holding element 54 in the first contour region 52 is raised relative to the remaining second contour region 60. Through the elevations 56 the inner wall of a pipe pushed over the end section 50 can be slightly widened in this region, so that between the inner wall of the pipe and the regions 62 adjoining the elevation a certain spacing and thus a flow channel is ensured.

The first contour regions 52 of two neighboring holding elements 54 are each offset by 90° in azimuthal direction in FIG. 3a. In this manner, the increased loading of the pipe material, which results from the elevations 56 in the first contour regions 52, is evenly distributed over the entire end section 50, so that an even mean azimuthal crimping degree over the entire end section 50 is ensured.

Figure 4A:
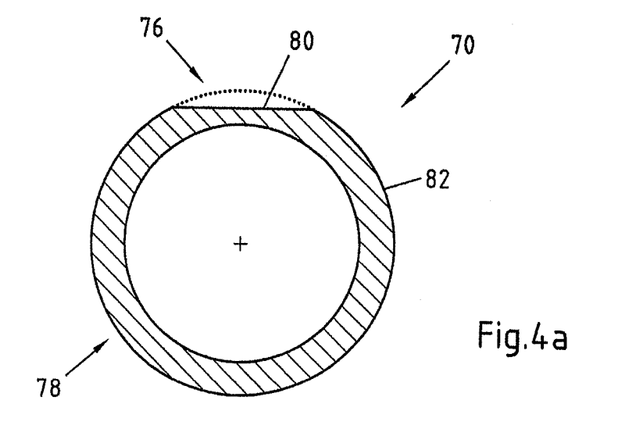
Figure 4B:
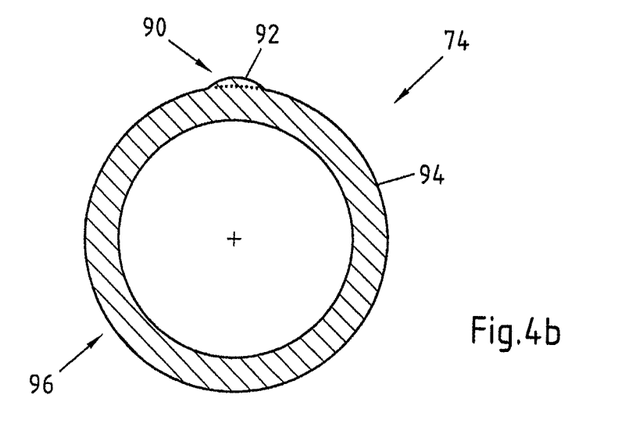
Figure 4C:
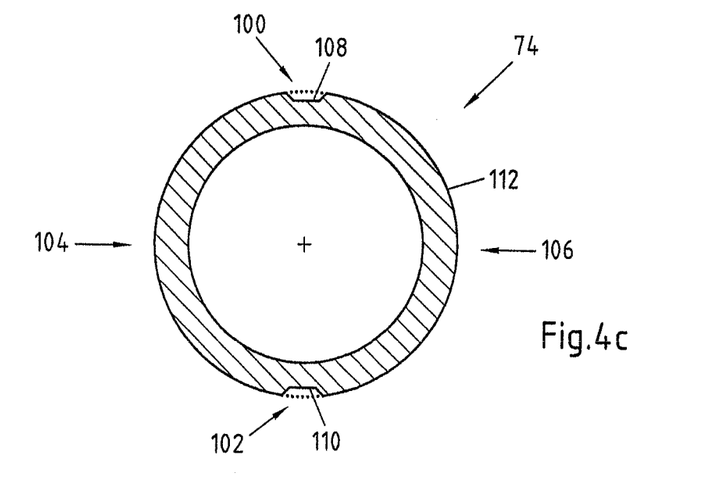

FIGS. 4a, 4b and 4c show cross sections of holding elements 70, 72 and 74 of three additional exemplary embodiments of a tubular component according to the invention.

The holding element 70 in FIG. 4a comprises a first contour region 76 and a second contour region 78. In the first contour region 76 a flattening 80 is provided, so that the outer contour 82 of the holding element 70 in the first contour region 76 is lowered relative to the second contour region 78. The holding element 72 in FIG. 4b differs from the holding element 70 in FIG. 4b in that in the first contour region 90 of the holding element 72 an elevation 92 instead of a flattening is provided. Because of this, the outer contour 94 of the holding element 72 in the first contour region 90 is raised relative to the remaining second contour region 96. The holding element 74 shown in FIG. 4c comprises two first contour regions 100, 102 and two second contour regions 104, 106. In the first contour regions 100, 102 clearances 108, 110 are provided, so that the outer contour 112 of the holding element 74 in the first contour regions 100, 102 is lowered relative to the second contour regions 104, 106. The clearances 108, 110 can for example be limited through a plurality of surfaces. The adjoining surfaces preferably have an angle relative to one another of less than 90°, especially of less than 45°, in order to ensure secure sealing of the clearances 108, 110 following the crimping of the connection. The clearances can alternatively be limited also through one or a plurality of curved surfaces. Alternatively, more than two clearances can also be provided. One or a plurality of clearances 108, 110 can especially be replaced also through a flattening or through an elevation.

With the exemplary embodiments of the tubular component according to the invention belonging to the holding elements 70, 72 and 74 the first contour regions 76, 90, 100, 102 of at least two axially offset holding elements 70, 72, 74 are offset relative to one another in azimuthal direction. In the case of neighboring holding elements with a plurality of first contour regions these are preferably offset relative to one another so that in each case all first contour regions are offset relative to one another. With the holding element 74 shown in FIG. 4c, offsetting by 180° therefore has to be avoided.

Especially, different holding elements 70, 72, 74 can also be combined in a single exemplary embodiment of the tubular component according to the invention. By doing so, particularly flexible adaptation to the requirements of the connection is possible.

Figure 5:
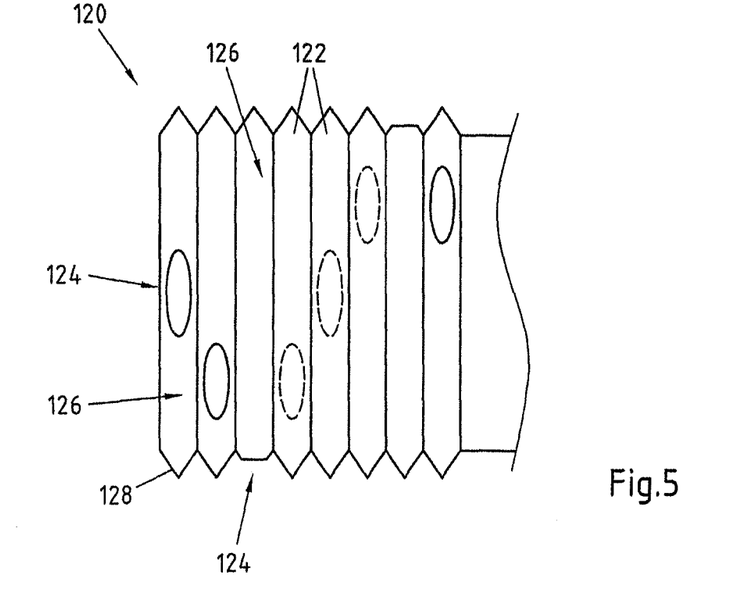
FIG. 5 shows a sixth exemplary embodiment of a tubular component according to the invention.

FIG. 5 shows a sixth exemplary embodiment of a tubular component, wherein for the sake of clarity merely the end section 120 is shown in top view. The end section 120 comprises holding elements 122 which are spaced in axial direction of the end section 120. The holding elements 122 each comprise first contour regions 124 and second contour regions 126. In the first contour regions 124 the outer contour 128 of the holding elements 122 is lowered relative to the second contour regions 126 for example through a flattening or a clearance and/or raised through an elevation. The first contour region 124 of two neighboring holding elements 122 are arranged for example each offset by 45° relative to each other in azimuthal direction in the exemplary embodiment shown in FIG. 5. In this manner it is achieved that when crimping the end section 120 to a pipe the weakening of the connection or the loading of the pipe, respectively, is distributed over the entire circumference of the end section, so that a more secure joining is ensured.

Figure 6:
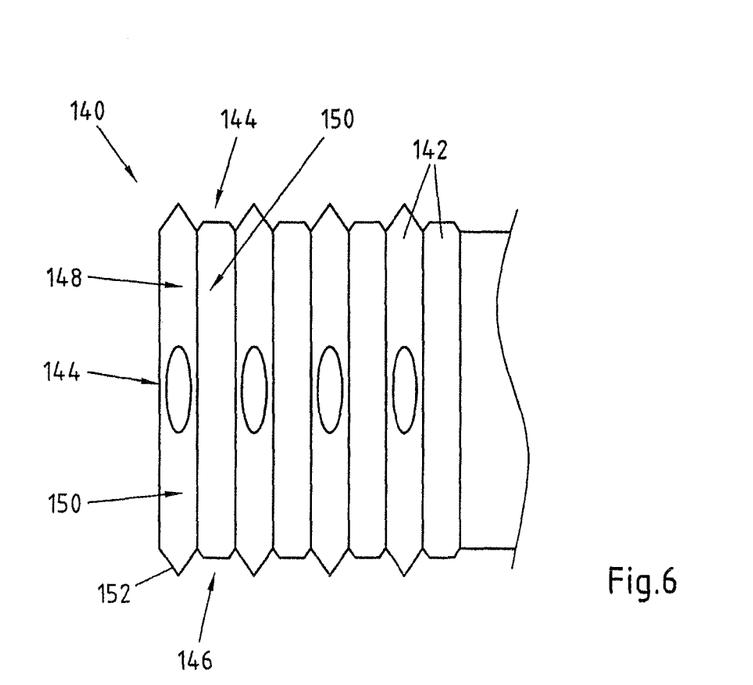
FIG. 6 shows a seventh exemplary embodiment of a tubular component according to the invention.

FIG. 6 shows a seventh exemplary embodiment of a tubular component according to the invention, wherein in turn only the end section 140 is shown in top view. The holding elements 142 offset in axial direction of the end section 140 in this exemplary embodiment each comprise two first contour regions 144, 146 and two second contour regions 148, 150. The first contour regions 144, 146 are offset relative to each other by an azimuthal angle of 180°. However, other angles and/or another number of first contour regions are also conceivable. In the first contour regions 144, 146 the outer contour 152 of the holding elements 142 is raised and/or lowered relative to the second contour regions 148, 150. The first contour regions 144, 146 of two neighboring holding elements 142 are each arranged offset by 90° in azimuthal direction. In this manner, no first contact region 144, 146 is located opposite another first contour region 144, 146 of the neighboring holding element 142. Because of this, a distribution of the weakening of the connection with a pipe or the loading of the pipe, respectively, over the circumference of the end section 140 is achieved.

Figure 7A:
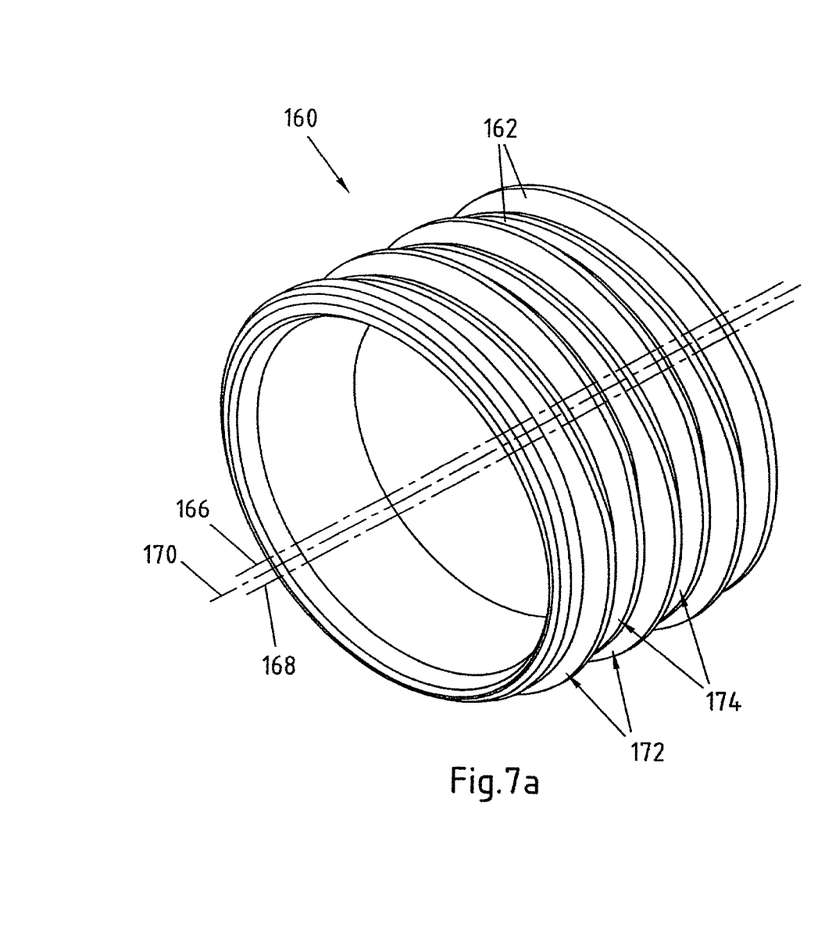
Figure 7B:
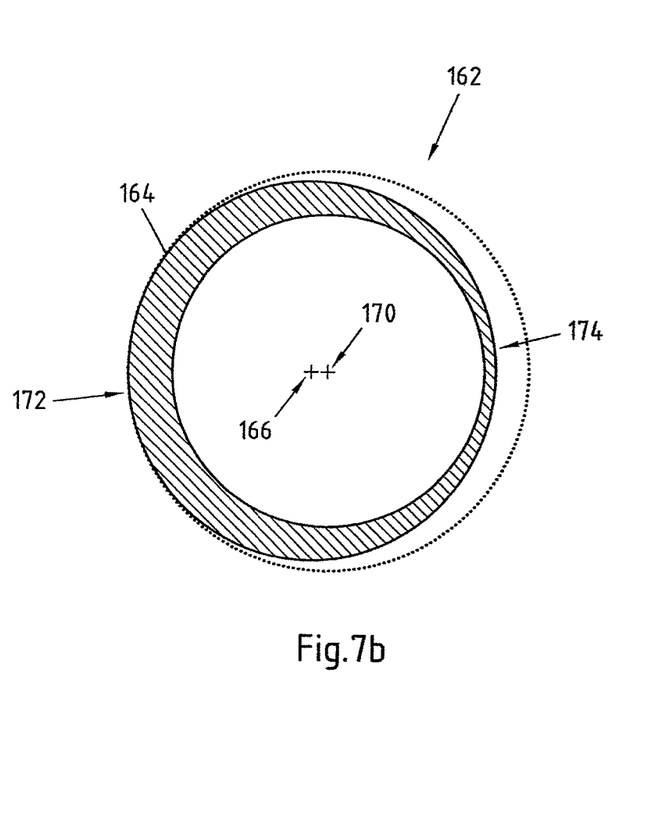

FIGS. 7a and 7b show an eighth exemplary embodiment of a tubular component according to the invention. FIG. 7a shows a perspective view of the end section 160 of the tubular component and FIG. 7b shows a cross section of one holding element 162 of the holding elements provided on the end section 160. The outer contour 164 of the holding elements 162 is designed ring-shaped and its center axes 166, 168 are radially offset relative to each other and preferably also relative to the center axis 170 of the end section 160. The spacing between the center axes 166, 168, 170 preferably amounts to between 0.1 and 0.9 mm, especially between 0.1 and 0.3 mm. By shifting the center axis 166, 168 the holding elements comprise a first contour region 172 and a second contour region 174, wherein the outer contour 164 of the holding element 162 in the first contour region 172 is raised relative to the second contour region 174. The first contour regions 172 of two neighboring holding elements 162 of the end section 160 are each offset relative to each other by an azimuthal angle of 180°. Alternatively, however, other angles, for example of 90°, are also conceivable. If a pipe is now pushed over the end section 160 the first contour regions 172 of a first and a next but one holding element 162 ensure that between the outer contour 164 of the holding element 162 arranged in-between and the pipe a spacing remains in the second contour region 174. In this manner, a flow channel is available in the region of this middle holding element 162.

Preferably the shifting of the center axis of the outer contour of a holding element can be combined with the provision of a flattening, a clearance or an elevation. In this manner, the outer contour of the holding elements can be adapted even better to the requirements of a certain connection.

For producing the tubular component, especially plastic injection moulding is preferred since with this the profile of the end section can be produced economically and with sufficient precision. The tubular component therefore preferably consists of plastic, especially of a plastic suitable for plastic injection moulding.

The invention claimed is:
1. A tubular component,
with an end section comprising a profile,
wherein the profile comprises a plurality of holding elements axially offset in longitudinal direction of the end section,
wherein the plurality of holding elements comprise at least one first azimuthal contour region and at least one second azimuthal contour region and
wherein an outer contour of one of the plurality of holding elements in the first azimuthal contour region at least in sections is lowered or raised relative to the second azimuthal contour region,
wherein the first azimuthal contour regions of at least two of the plurality of holding elements are offset relative to each other in azimuthal direction, and
wherein the plurality of holding elements comprise a substantially ring-shaped outer contour and the center axes of two neighboring holding elements are offset relative to each other.

2. The tubular component according to claim 1, wherein the first azimuthal contour regions of two neighboring holding elements are offset relative to one another in azimuthal direction.

3. The tubular component according to claim 2, wherein the first azimuthal contour regions of two neighboring holding elements are offset relative to one another in azimuthal direction by an angle between 15 and 180°.

4. The tubular component according to claim 1, wherein first azimuthal contour regions of two neighboring holding each do not overlap in azimuthal direction.

5. The tubular component according to claim 1, wherein first azimuthal contour regions of the plurality of holding elements are substantially distributed evenly over the entire azimuthal angular range.

6. The tubular component according to claim 1, wherein first azimuthal contour regions comprise a flattening, a clearance and/or an elevation.

7. The tubular component according to claim 1, wherein first azimuthal contour regions and/or second azimuthal contour regions are designed similarly or dissimilarly.

8. The tubular component according to claim 1, wherein the center axes of two neighboring holding elements are offset radially relative to each other.

9. The tubular component according to claim 1, wherein the outer contours of the plurality of holding elements are substantially designed similarly except for an azimuthal and/or radial offset.

10. The tubular component according to claim 1, wherein the tubular component is designed of a plastic.

* * * * *

UNITED STATES PATENT AND TRADEMARK OFFICE
CERTIFICATE OF CORRECTION

| | | |
|---|---|---|
| PATENT NO. | : 8,770,230 B2 | Page 1 of 1 |
| APPLICATION NO. | : 12/960803 | |
| DATED | : July 8, 2014 | |
| INVENTOR(S) | : Nadine Steinhanses et al. | |

It is certified that error appears in the above-identified patent and that said Letters Patent is hereby corrected as shown below:

In the Claims

Column 8, Line 29, Claim 4, after "holding" insert -- elements --

Signed and Sealed this
Twenty-first Day of October, 2014

Michelle K. Lee
*Deputy Director of the United States Patent and Trademark Office*